US012799982B2

(12) United States Patent
Mcleod et al.

(10) Patent No.: US 12,799,982 B2
(45) Date of Patent: Nov. 17, 2026

(54) TAMPER RESISTANT ANTI-TIP SYSTEM

(71) Applicant: WESKO LOCKS LTD., Mississauga (CA)

(72) Inventors: John Mcleod, Toronto (CA); Tonino Sabelli, Oakville (CA)

(73) Assignee: WESKO LOCKS LTD., Mississauga (CA)

( * ) Notice: Subject to any disclaimer, the term of this patent is extended or adjusted under 35 U.S.C. 154(b) by 311 days.

(21) Appl. No.: 18/392,783

(22) Filed: Dec. 21, 2023

(65) Prior Publication Data

US 2025/0075743 A1 Mar. 6, 2025

(30) Foreign Application Priority Data

Aug. 28, 2023 (CA) ..................................... 3210448

(51) Int. Cl.
*F16C 41/00* (2006.01)

(52) U.S. Cl.
CPC ........ *F16C 41/001* (2013.01); *F16C 2314/72* (2013.01)

(58) Field of Classification Search
CPC ............................ F16C 2314/72; F16C 1/001
USPC .................................... 312/334.44, 216–220
See application file for complete search history.

(56) References Cited

U.S. PATENT DOCUMENTS 78,449 A 6/1868 Gibbs
428,941 A 5/1890 Pauly, Sr.
1,324,162 A 12/1919 Lau
1,422,631 A 7/1922 Stafford
3,029,118 A 4/1962 Schuette
3,046,777 A 7/1962 Schlage
3,497,280 A 2/1970 Olree et al.
3,589,783 A 6/1971 Studinski et al.
3,866,993 A 2/1975 Dean et al.
3,888,558 A 6/1975 Himsl
3,900,236 A 8/1975 Goulish et al.
3,969,008 A 7/1976 Pergler
3,998,508 A 12/1976 Scheerhorn
4,239,309 A 12/1980 De Fouw et al.
4,355,851 A * 10/1982 Slusser ................ E05B 65/463 312/220
4,429,930 A 2/1984 Blouin
4,637,667 A 1/1987 Reid et al.
4,662,689 A 5/1987 Chatterson et al.
4,662,776 A * 5/1987 Hedstrom ............ E05B 65/463 403/348

(Continued)

*Primary Examiner* — Daniel J Troy
*Assistant Examiner* — Timothy M Ayres
(74) *Attorney, Agent, or Firm* — ROTHWELL, FIGG, ERNST & MANBECK, P.C.

(57) ABSTRACT

A tamper resistant anti-tip system includes a single piece assembly with a track between a first closed end and second end, securable in a recess in a cabinet sidewall. Stacked sliding bars are associated with N retractable drawers, N−1 sliding bars slide within the track between a first plug fixed at the first end and a terminal second end. A gap is defined between the first plug and a second plug when all of the drawers are closed, and the gap is closed when a single drawer is open to prevent opening of the other drawers, a levered cam on the associated sliding bar is moved to an open position when the associated drawer is open, the second plug moves away from the first plug to form the gap. The second plug closes the gap, and the cam is closed when the drawer is closed.

14 Claims, 16 Drawing Sheets

(56) References Cited

U.S. PATENT DOCUMENTS

| | | | | |
|---|---|---|---|---|
| 4,820,002 | A | 4/1989 | Lechner et al. | |
| 4,838,624 | A | 6/1989 | Walla | |
| 4,864,686 | A * | 9/1989 | Lasier | E05D 15/0621 16/49 |
| 4,925,257 | A | 5/1990 | Frederiksen et al. | |
| 4,936,640 | A | 6/1990 | Pratzer | |
| 5,056,876 | A | 10/1991 | Scheerhorn | |
| 5,056,877 | A | 10/1991 | Westwinkel | |
| 5,062,678 | A | 11/1991 | Westwinkel | |
| 5,074,627 | A | 12/1991 | Broeders | |
| 5,176,436 | A | 1/1993 | Mitchell | |
| 5,199,774 | A | 4/1993 | Hedinger et al. | |
| 5,303,994 | A | 4/1994 | Elsholz et al. | |
| 5,333,949 | A | 8/1994 | McGregor | |
| 5,387,032 | A | 2/1995 | Reisbeck | |
| 5,411,327 | A | 5/1995 | Norton | |
| 5,427,445 | A | 6/1995 | Mitchell | |
| 5,544,957 | A | 8/1996 | Schmidt | |
| 5,567,027 | A | 10/1996 | McClung et al. | |
| 5,599,078 | A | 2/1997 | Dechene et al. | |
| 5,702,167 | A | 12/1997 | Muller | |
| 5,839,803 | A | 11/1998 | Lizell | |
| 5,988,778 | A | 11/1999 | Lammens | |
| 6,109,708 | A * | 8/2000 | Walla | E05B 65/464 312/216 |
| 6,186,606 | B1 | 2/2001 | Krei | |
| 6,254,205 | B1 | 7/2001 | Wright et al. | |
| 6,450,596 | B1 * | 9/2002 | Lee | E05B 65/464 312/217 |
| 6,550,876 | B2 | 4/2003 | Lammens | |
| 6,698,258 | B2 | 3/2004 | Westwinkel | |
| 6,896,342 | B1 * | 5/2005 | Cheng | E05B 65/463 312/217 |
| 6,932,445 | B2 | 8/2005 | Chiu | |
| 7,320,507 | B2 | 1/2008 | White et al. | |
| 7,520,576 | B2 | 4/2009 | Ludwig et al. | |
| 7,823,992 | B2 * | 11/2010 | Chen | E05B 65/463 312/216 |
| 8,220,879 | B2 | 7/2012 | Chen et al. | |
| 8,277,000 | B2 | 10/2012 | Huang | |
| 8,371,664 | B1 | 2/2013 | Chen | |
| 8,746,816 | B2 | 6/2014 | Westwinkel | |
| 8,870,308 | B2 * | 10/2014 | Freimuth | E05B 65/464 312/218 |
| 8,899,699 | B2 * | 12/2014 | Fulterer | A47B 88/477 312/217 |
| 10,145,149 | B2 * | 12/2018 | Westwinkel | E05B 65/464 |
| 2003/0141790 | A1 | 7/2003 | Weng | |
| 2007/0284976 | A1 | 12/2007 | Huang | |
| 2008/0074017 | A1 | 3/2008 | Ruan et al. | |
| 2008/0106175 | A1 | 5/2008 | Huang | |
| 2011/0127889 | A1 | 6/2011 | Ludwig et al. | |
| 2014/0265761 | A1 * | 9/2014 | Ropele | E05B 65/464 312/218 |

* cited by examiner

TAMPER RESISTANT ANTI-TIP SYSTEM

CROSS REFERENCE TO RELATED APPLICATION

This application claims the benefit of Canadian Patent Application No. 3,210,448, filed Aug. 28, 2023. The entire content of the above-referenced application is hereby incorporated by reference.

FIELD OF THE INVENTION

This invention relates to an anti-tip system for use with movable storage structures including home furniture designed for Ready To Assemble (RTA) furniture (i.e., packed flat in a box for assembly by the consumer). A DIY (do it yourself) assembly for installation of a single piece assembly in a storage structure such as a furniture kit is also provided. A kit for manufacturing single piece assemblies of the anti-tip system is also included. The invention further includes tamper resistant features to inhibit risks of furniture (or other storage units) tipping over and injuring customers and their children.

BRIEF OVERVIEW OF THE INVENTION

The following is a brief overview of certain embodiments and aspects of the invention. This overview should not be considered as limiting the scope of the invention or possible modifications, substitutions or variants which are not expressly mentioned in this overview but would be understood by persons skilled in the art upon reading the entirety of this application.

There is a need for easily assembled furniture and other storage units which may be used by or encountered by children and other users. There is also a need for DIY easily assembled furniture having anti-tip features.

In one embodiment, the invention includes a tamper resistant anti-tip system for use in a storage structure, the system comprising a tamper resistant closed single piece assembly. The storage structure may have 2 or more retractable compartments (for example, drawers) comprising a first retractable compartment and a second retractable compartment. In this aspect, the system comprises the following features.

In a single piece assembly of the present invention a track is configured for secure attachment when installed within an optional mounting recess provided on an inside side wall of the storage unit. In other variants, the single piece assembly may be configured for mounting on a smooth surfaced inside wall, or an elevated surface on an inside wall, of a storage unit depending on the clearance space between the inside wall and an associated movable storage compartment (for example, a drawer).

An inner side wall includes an inner left side wall, an inner right side wall and an inner rear side wall. An "inner left side" may mean the inner left side when looking at the front of the storage structure, into an opening when a storage compartment, for example, a drawer is opened. The inner right side may mean the inner side of the storage structure which is opposite the inner left side. The inner rear side wall extends between the inner left side wall and the inner right side wall. The inner rear side wall is visible at the back of the interior of the storage structure when a storage compartment is opened. Persons skilled in the art will understand that the available choices for locating the placement of the single piece assembly and the mounting recess will depend on various considerations. For example, choosing a preferred type and location of a mounting recess may depend on the size and placement of the storage compartments, spatial limitations for mounting the single piece assembly on a particular inner side wall, the type of slides supporting the storage compartments and their locations, the preferred choice of materials, and other considerations.

A stack of at least N number of aligned sliding bars comprising at least N−1 number of sliding bars are configured to slide along the track when installed within the track of the single piece assembly. The single piece assembly includes cammed levers acting on drawer slides associated with movable drawers, when the single piece assembly is secured within the mounting recess or other mounting feature provided in the storage unit. The stack of at least N sliding bars includes a first sliding bar associated for selective opening and closing operation with the first retractable compartment and a second sliding bar associated for selective opening and closing operation with the second retractable compartment. It will be understood that the numbers N and N−1 sliding bars are the minimum number of bars needed to span the operational distance within opposing ends of the single piece assembly. In some embodiments more than one bar may be used to span a distance along the track that could be spanned by a single bar.

A sliding bar segment is configured to slide along the track between a fixed first plug and a second movable plug displaced by an affected sliding bar segment. The sliding bar segment is configured to abut against the first sliding bar when all of the retractable compartments are closed.

The system is configured to allow displacement of one or more of the aligned sliding bars along the track limited to a displacement distance defined by a gap between the fixed first plug and the movable second plug when all of the retractable compartments are closed. The gap is closed when one of the storage compartments is opened and the other retractable compartments are inhibited from opening at the same time.

Each of the retractable storage compartments is configured for opening and closing movement along retractable slides. Each slide defines a first linear wall having a riser extending outwardly from the first linear wall. The riser also extends outwardly in parallel along the track. The gap is defined by a displacement distance comprising a displacement increment corresponding to the height of the slide measured at a top of the first linear wall and the distance between the top of the first linear wall and a top of the riser. The gap may also include an increment based on an aggregate of manufacturing tolerances.

The furniture manufacturer designs and positions the hole (size, shape & location) in the furniture side panel to accommodate an aggregate of manufacturing tolerances in all of the components of a furniture unit.

In another embodiment, the invention includes a tamper resistant anti-tip system configured as a single assembly for installation and use in a storage structure. The system may be configured for secure attachment within a mounting recess in an interior sidewall of the storage structure. The storage structure may have 2 or more retractable compartments comprising a first retractable compartment and a second retractable compartment.

In this embodiment, the system comprises the following elements.

A track may be configured as a component within a closed single piece assembly to be secured within the mounting recess. In a preferred embodiment in which the single piece assembly including the track component are secured within the mounting recess. Mounting features may be provided for securing the single piece assembly in alignment with the drawer slides supporting the retractable drawers. Preferably, when the cabinet slide members are secured to the cabinet inside wall, the single piece assemblies are secured in place for proper alignment with the drawer slides. One or more fasteners including other securing features (for example, suitable adhesives, two sided tape) may be used to secure the single piece assembly within the mounting recess. In some aspects, the single piece assembly may be configured to interact with features on an associated interior side wall to fasten the single piece assembly to the storage unit (for example, by snap fit, press fit, or slide fit interaction).

A stack of N−1 aligned sliding bars is configured to slide along the track when the single piece assembly is installed in the storage structure. The stack of sliding bars comprises a first sliding bar associated for selective opening and closing operation with the first retractable compartment and a second sliding bar associated for selective opening and closing operation with the second retractable compartment.

A sliding bar segment abutting against the first sliding bar when the system is installed and all of the retractable compartments are closed. The sliding bar segment is configured to slide along the track between a first plug and a second plug positioned between the first plug and the sliding bar segment. The first plug may be adjustably secured at a first closed end of the track. The second plug may be biased to separate the second plug and the stack of sliding bars from the first plug while the first plug abuts against a second closed end of the track to form a gap between the first plug and the second plug when all of the retractable compartments are closed.

The system is configured to allow displacement of one or more of the aligned sliding bars along the track limited to a displacement distance defined by the gap between the first plug and the second plug when all of the retractable compartments are closed, and the gap is closed when one of the storage compartments is opened.

When the system is installed in the storage structure, each of the retractable storage compartments is configured for selectively opening and closing movement along retractable slides associated with the retractable storage compartments. Each slide defines a first linear wall having a riser atop the first linear wall. The gap is defined by a displacement distance comprising a displacement increment corresponding to the distance between a top of the first linear wall and a top of the riser.

In another aspect, a tamper resistant anti-tip system is configured as a single piece assembly for installation and use in a storage structure. The system is configured for secure attachment within a mounting recess in an inner sidewall of the storage structure. The storage structure includes a first retractable compartment and a second retractable compartment. The system includes the following elements for installation within the storage structure.

A partially enclosed or closed single piece assembly, comprising a track, is configured for secure attachment within the mounting recess using, for example, a single fastener to an inside side wall of the storage structure. Preferably, the single piece assembly comprising the track is closed at a first end and at a second end opposite the first end.

A stack of N−1 aligned sliding bars is configured to slide within the track when installed in the storage structure. The stack of sliding bars comprises a first sliding bar associated for selective opening and closing operation with the first retractable compartment and a second sliding bar associated for selective opening and closing operation with the second retractable compartment.

A sliding bar segment is configured to abut against the second plug to compress the gap and to abut against the first sliding bar when one of the storage compartments in the storage structure is opened. The sliding bar segment is configured to slide along the track and opening the gap between a first plug and a second plug when the storage compartment is opened. The first plug may be adjustably secured adjacent a first closed end of the track and the second plug wherein the second plug is biased to separate the second plug and the stack of sliding bars from the first plug and the second plug is biased to abut the stack of sliding bars against a second closed end of the track when all of the storage compartments are closed.

The system is configured to allow displacement of one or more of the aligned sliding bars along the track wherein the displacement is limited to a displacement distance defined by the gap between the first plug and the second plug when all of the retractable compartments are closed, and the gap is closed (for example, compressed) when one of the storage compartments is opened.

The gap is defined in part by a displacement distance comprising a displacement increment corresponding to the distance between a top of the first linear wall of a retractable slide and a top of the riser extending upwardly from the top of the first linear wall. The gap may be based on a second increment corresponding to an aggregate of manufacturing tolerances.

Where the gap may be increased, the length of the tip of each levered cam associated with a leading edge of a retractable slide may be increased so that the tip is of sufficient length to inhibit opening of the unopened associated storage compartments when another storage compartment is opened.

Alternatively, a single piece assembly may be provided with a range of selectable mounting positions within a mounting recess, so that the single piece assembly may be positioned in an optimal location for optimal engagement between each cammed lever and its corresponding leading edge of an associated storage compartment.

In a preferred embodiment, each sliding bar supports a levered cam having a cam tip which engages the leading edge of the associated retractable slide when the associated storage compartment is closed and the cam tip disengages from the leading edge when the storage compartment is moved to the open position.

A leading edge may be provided on an outwardly projecting activation contact as an engagement structure, for example an outwardly projecting surface on an abutment extending from a side wall of the drawer. The leading edge may be configured as an add-on dummy drawer slide attachment or other outwardly projecting activation contact for use with storage compartments without side-mounted drawer slides. Suitable outwardly projecting activation contacts may be pins, flanges, brackets, or other add-on abutment structures (including abutment structures on a rear facing wall of a storage compartment) that may be used to create a leading edge for an associated storage compartment where, for example, side mounted drawer slides are not provided in the storage structure.

In the preferred embodiments, the storage structure, for example a cabinet, dresser, end tables, or any furniture item with multiple drawers, the furniture manufacturer will provide a mounting recess in the side wall panel with a router or other machinery. The mounting recess may be configured with a feature to ensure that the single piece assembly is secured in a predetermined location within the mounting recess.

The mounting recess may be configured in different features and provided in different locations within the storage structure. By way of example, the mounting recess may be configured as a mounting channel within one or more brackets mounted on the surface of an inner side wall of the storage structure where adequate space is available. Such an arrangement may be particularly useful in applications where storage compartments are movable on undermounted slides and adequate mounting space is available along the rear inner side wall of a storage structure. In some embodiments, the brackets or other mounting features may be mounted on the rear inner side walls of the storage structure so that the single piece assembly and the cammed levers operate in a plane perpendicular to the rear inner side wall and the rear outer side wall of the storage compartment. In the preferred embodiments, the single piece assembly and the cammed levers will be configured for installation so that only one of the cammed levers (and the associated sliding bars) will be activated, and the gap will be closed, when one storage compartment is moved outwardly from within the storage structure, while retaining the other storage compartments in the closed position.

In addition, in many embodiments utilizing drawer slides, the location of the drawer slides will be moved back (toward the rear of the cabinet away from previously, common placement adjacent the front of the cabinet) to provide sufficient room for the cam lever to work. It is possible in some embodiments to hold the self contained single piece assembly snugly in place within the mounting recess by the closely positioned drawer slides, without additional screws. However, in a preferred embodiment, a single screw extending through a preformed hole in the track and into a predrilled screw hole may be used in DIY applications to position and secure the self contained assembly in the preferred location This configuration may apply when a top plug locating pin is not used. Furthermore, the configuration of the mounting recess may be sized to provide a suitable fit for the single piece assembly when that complete assembly is installed within the mounting recess. For example, the mounting recess may be configured for a slide fit, snug fit, snap fit, other fitting with the single piece assembly when the assembly is inserted.

In a preferred embodiment, the first and second plugs are biased to separate with a spring to form a gap G when the drawers are closed (and closing the gap when a single drawer is retracted), and the plugs are held in place within the track abutting against a stacked array including a sliding bar segment, N number of sliding bars of which N−1 sliding bars are configured to slide within the track across a distance equal to the gap, and preferably one sliding bar at an opposite terminal end of the track remains stationary. When a single drawer is retracted to an opened position, a cammed lever on an associated drawer slide is opened, causing the sliding bar segment and the second plug to move toward the first plug, to compress the gap when the drawer is open and to prevent other drawers from opening at the same time.

In another preferred aspect, the contents within the partially enclosed track may be held in position by a top block locating pin to create a gap distance “Y” and limit the displacement of the contents of the track assembly when a drawer is opened (so that the first plug, comprising the top block, and the second plug are moved together in abutment to close the gap G to prevent other drawers from opening).

Preferably, the distance “Y” will also include aggregate manufacturing tolerances of the furniture manufacturer. That is, in some instances, the gap G may be varied by adjustment, for example, increased, above the dimension of the slide member to allow the cammed lever to open sufficiently and permit withdrawal of the selected drawer, when needed. By way of another example, if the furniture manufacturer locates the slides or a mounting feature incorrectly (for example, a pin hole or preformed recess provided in the mounting recess), the “Y” dimension must be preserved or varied, as needed, to accommodate withdrawal of one selected drawer while preventing withdrawal of other drawers within the stacked array.

In a preferred embodiment, the cammed lever may be held upwardly in an open position because of the friction with an abutting cam follower, for example a detent, associated with that cammed lever, when the drawer is withdrawn. Preferably, when the withdrawn drawer is reinserted, the user will trip the lever downwardly to a fully closed position, in alignment with the leading edge of the associated drawer slide, prior to fully closing the associated drawer. Until the withdrawn drawer is fully reinserted into the cabinet, the assembly inhibits the other drawers from being opened.

In another embodiment of the invention in which the drawers in a multi drawer storage unit are not opened or closed by utilizing slides, the single piece system assembly may be associated for activation by “dummy slide profiles” applied to the drawers so that they may provide leading edge profiles to interact with the cammed levers of the single piece system assembly of the present invention. For example, furniture arrangements without side-mounted slides, undermount slides or wood furniture without slides may be fitted with “dummy slide profiles” on the sides of such drawers, each dummy slide profile defining a leading edge profile to engage with an associated cammed lever included in the single piece system assembly. The leading edge profile may be configured to be equivalent in height to a typical Euro drawer slide, and to activate the associated cammed lever and to displace the sliding bar assembly to close the gap, in a manner similar to the interaction created by an actual Euro drawer slide in a typical multi drawer cabinet. That is, both an actual Euro drawer slide and a dummy slide profile would present the same leading edge profile related to the size and operation of the gap.

Similarly, a mounting recess may be provided within an interior side wall of such a storage structure to receive the single piece system assembly between the vertical array of the dummy slide profiles and the adjacent wall of the single piece system assembly of the invention. In these arrangements, the furniture manufacturer may provide a dummy slide profile to each drawer by adding a strip of wood or other material to selectively interact with the cammed levers of the single piece system assembly in a manner similar to an interaction with a typical drawer slide, thereby providing the anti-tip feature to a stacked array of such alternative drawers. In place of the strip of wood, a pin may also be used although in this case the system becomes resettable. A child could then reach in the drawer and reset the cam lever thereby allowing an additional drawer to be opened. The mounting recess in the sidewall could also be moved away from the front of the cabinet (towards the rear) and in these cases a second pin or other shaped activator will be required to return the cam lever to the closed position when the associated drawer is closed.

In some aspects of the invention, an additional locking mechanism may be incorporated for use with the single piece system assembly, to inhibit unauthorized opening of one or more of the drawers in the stacked array of drawers. For example, a keyed lock mechanism may be provided to restrain the first and second plugs in the separated position, to maintain the gap, and thus prevent unauthorized opening of any of the drawers associated with the single piece system assembly.

Persons skilled in the art will understand that the system, including the single piece system assembly of the present invention may provide one or more benefits to manufacturers and to end users such as consumers of DIY furniture kits.

Some of the advantages of the present invention may include, with some embodiments, premanufactured single piece system assembles which do not require the use of fasteners including screws or complicated instructions or steps to correctly assemble a functioning furniture piece with the desired anti-tip features. For example, a single piece stem assembly may be inserted into place for a snug and properly aligned position within a mounting recess provided within an interior side wall of the furniture unit.

A simplified procedure for assembly of the furniture kits is particularly important in the ready-to-assemble and DIY furniture markets exemplified by big box stores and other retailers. It is desirable that a customer cannot install the anti-tip mechanism incorrectly when they assemble the DIY furniture, and especially children's furniture, for use within the home.

Another aspect of the invention provides a kit for manufacturing a range of single piece assemblies from components selected from groups of components having predetermined configurations, sizes, choices in materials, and to meet other specifications which may be set by their customers. These kits may be used by manufacturers to assemble and sell a range of anti-tip systems incorporating varying product types of the single piece assemblies of the present invention, for example as described further below.

Another desirable benefit includes configuring the single piece assembly so that it is not resettable by tampering with any of the internal features of a properly installed assembly when one drawer is opened. For example, a child cannot simply reach inside the opened drawer and flip the associated cammed lever or tamper with any of the other cammed levers to overcome the anti-tip feature and thus allow another drawer to be opened at the same time, which could possibly upset the furniture and endanger the child.

Persons skilled in the art will understand that other advantages or benefits may result during manufacture or use of the invention when applied to, for example, the residential furniture market and that there is a need to provide one or more of these or other advantages or benefits.

IN THE DRAWINGS

The following drawings illustrate examples of preferred embodiments of the present invention.

FIG. 1 shows a partial side view of a storage structure having two vertically stacked drawer slides engaged with a single piece system assembly of the present invention;

FIGS. 2*a*, 2*b*, and 2*c* show three examples of configurations of Euro slides which may be utilized in for example, residential furniture applications;

FIGS. 3*a*, 3*b*, 3*c*, 3*d*, 3*e* and 3*f* show a rear view of six examples of configurations of a locating feature which may be provided on the rear top plug for accurately locating the single piece system assembly within a channel provided in an interior side wall of a furniture cabinet;

Figure 4:
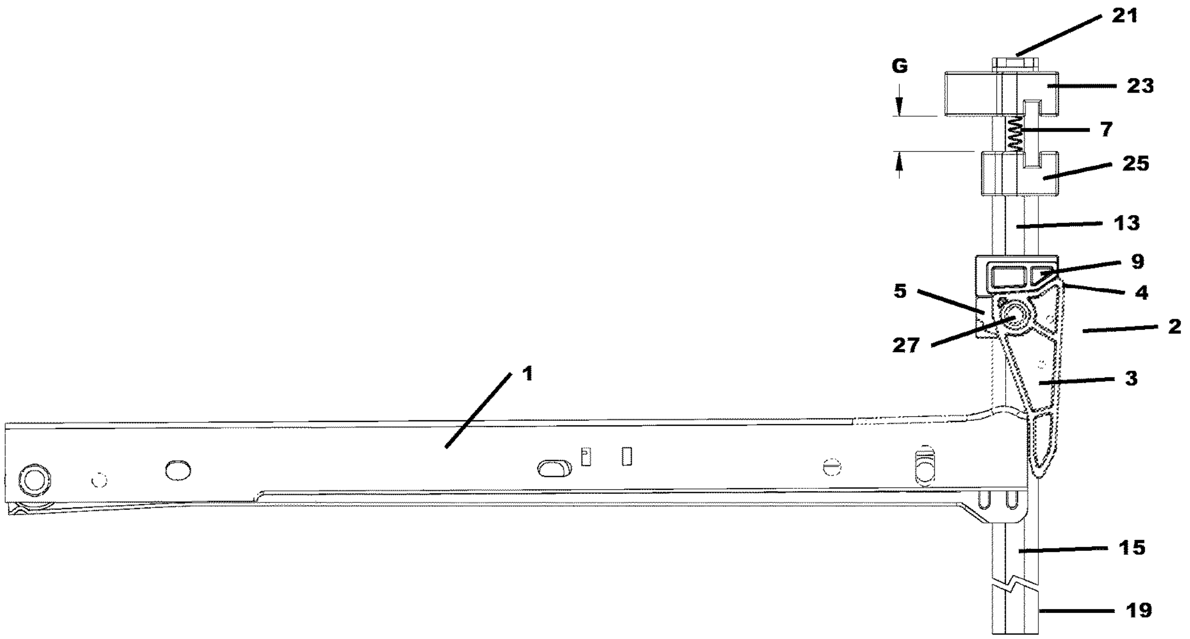
FIG. 4 shows a partial side view of one drawer slide associated with a top drawer in engagement with the single piece system assembly in which all other drawers are also closed.
Figure 5A:
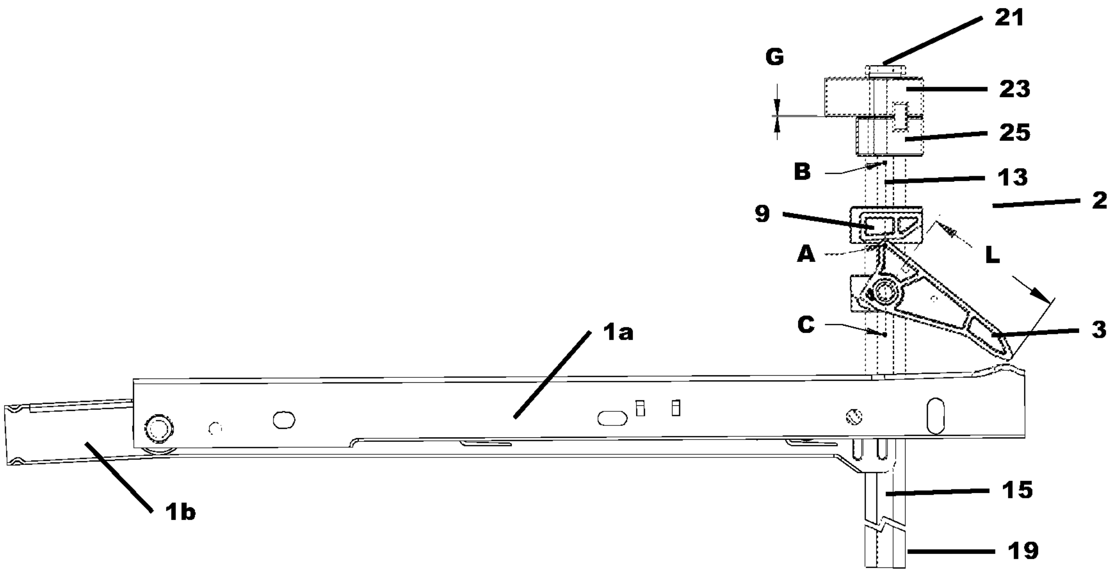
FIG. 5A shows the drawer slide of FIG. 4 acting on an associated cammed lever when the drawer is beginning to open.
Figure 5B:
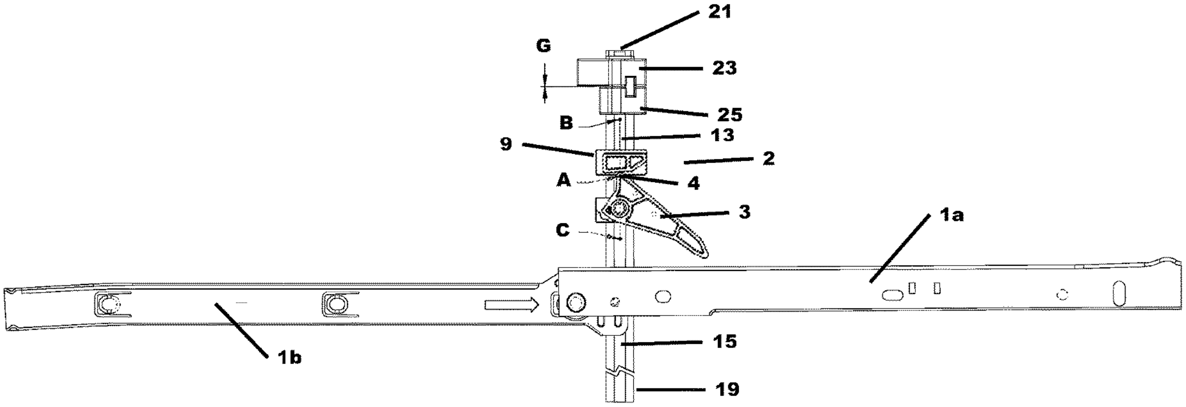
FIG. 5B shows the drawer slide of FIGS. 4 and 5A and the position of the associated cammed lever when the drawer is in the fully open position.
Figure 5C:
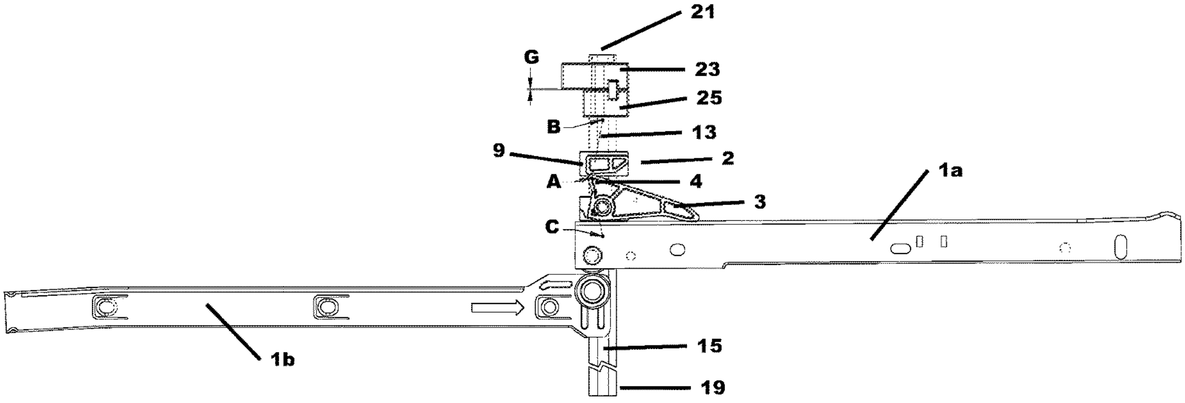
FIG. 5C shows the position of the cammed lever and the two parts of the drawer slide of FIGS. 4 and 5A-5B as the drawer is being removed by lifting the drawer and disengaging the drawer mounted portion of the drawer slide from the wall mounted portion of the drawer slide.
Figure 5D:
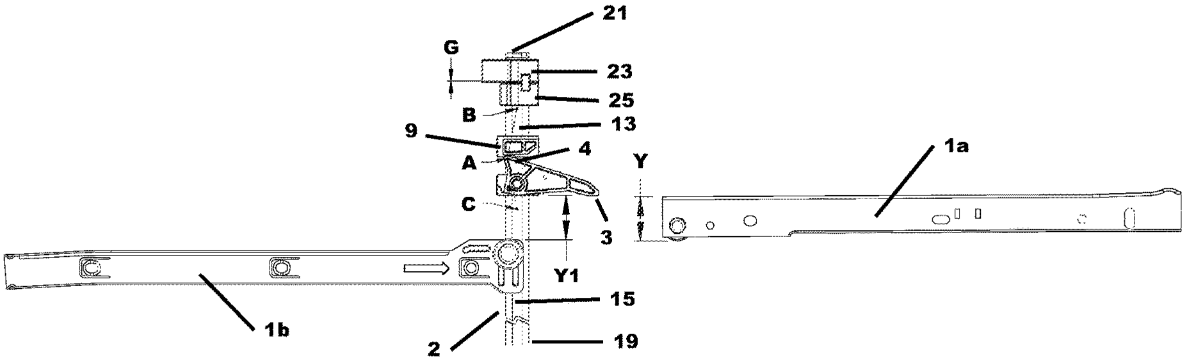
Figure 5E:
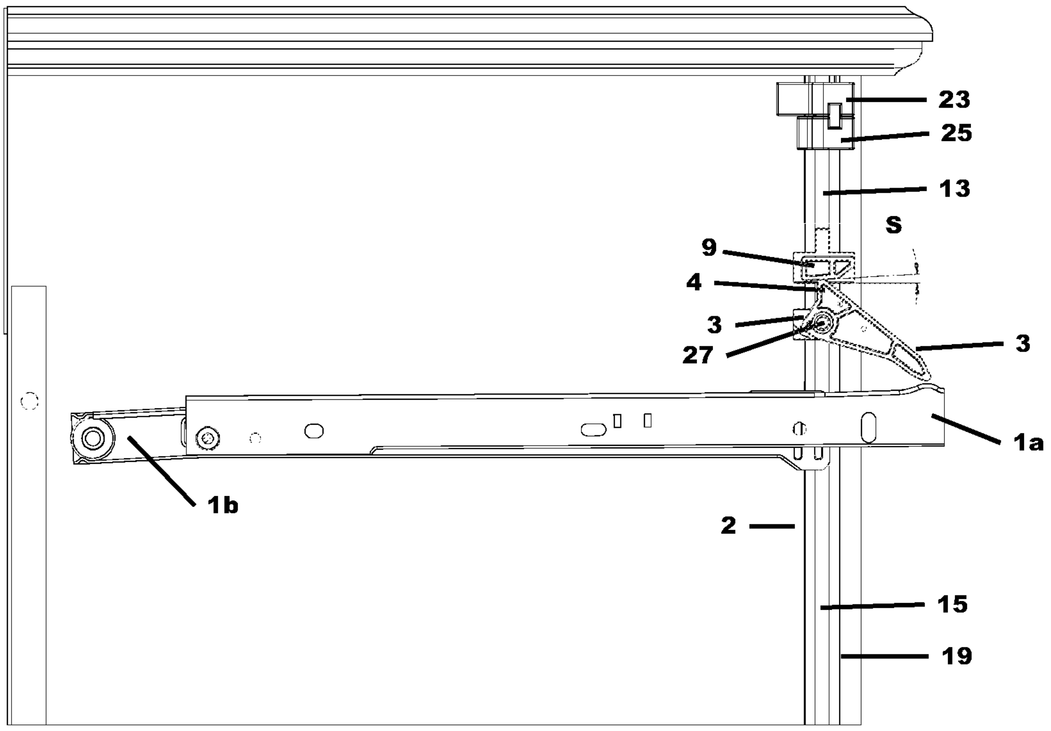

FIG. 5D shows the drawer slide of FIG. 5C with the largest displacement of the cammed lever from its starting position when the drawer is fully removed from engagement with the system assembly and the drawer mounted portion of the drawer slide is fully disengaged from the wall mounted portion of the drawer slide; and FIG. 5E shows the drawer slide of FIGS. 4 and 5A-5D when the withdrawn drawer is reinserted and the fully opened, associated cammed lever is reset to the closed position by moving through successive positional detents, to reset the associated cammed lever in the closed position.

Figure 6:
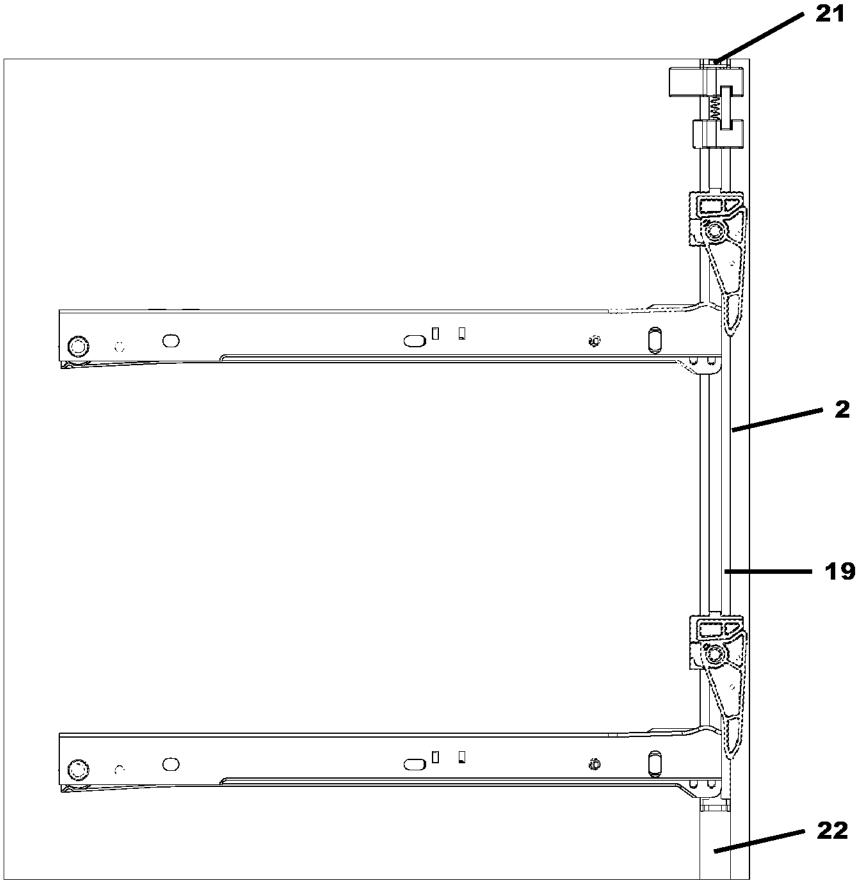

FIG. 6 shows a side view of the drawer slides and associated drawers in the fully closed positions with the cammed levers engaging the leading edges of their associated drawer slides.

Figure 7:
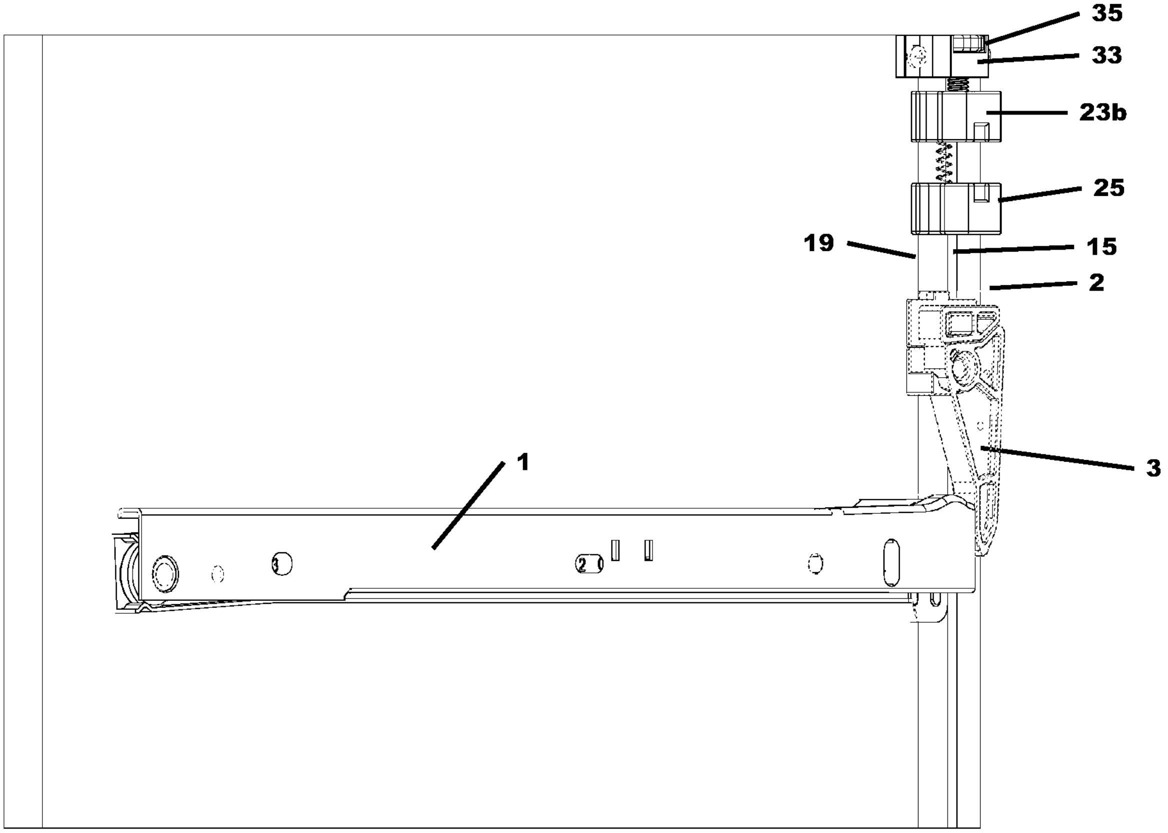

FIG. 7 shows a variant of the invention in which the single piece assembly 2 comprises a lead screw plug 33 and a lead screw 35.

Figure 8A:
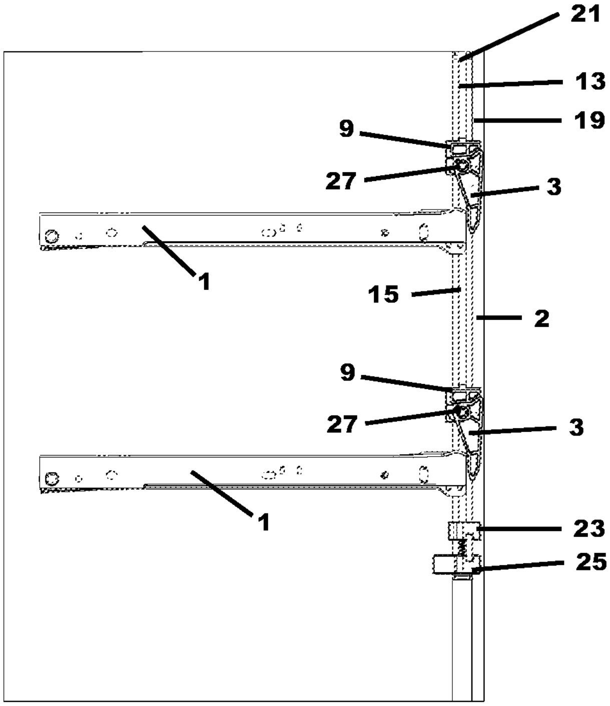
Figure 8B:
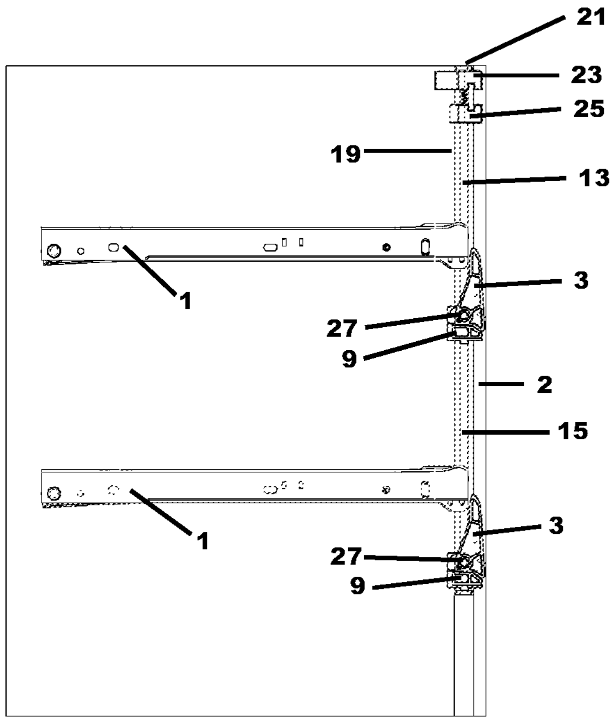
Figure 8C:
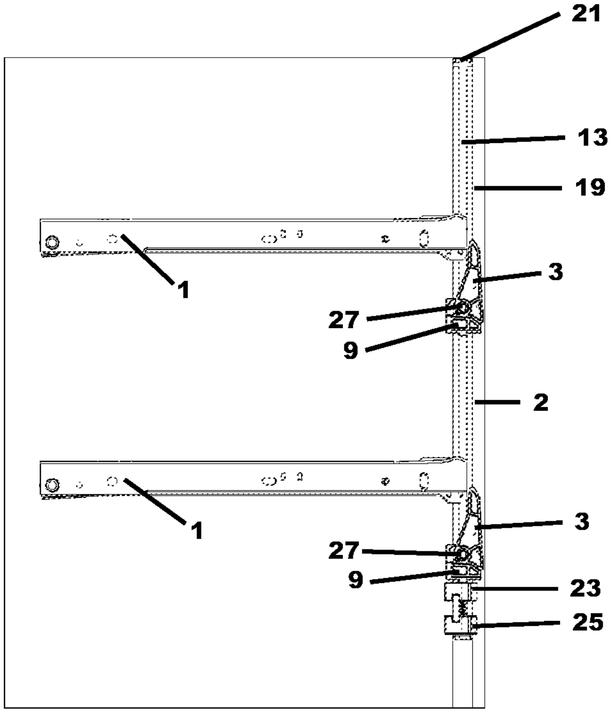

FIGS. 8A, 8B and 8C show another variant of the present invention in which the top plug 23 and the bottom plug 25 (which define an intermediate gap G) are located in position inwardly from the terminal ends of the single piece assembly 2.

Figure 9:
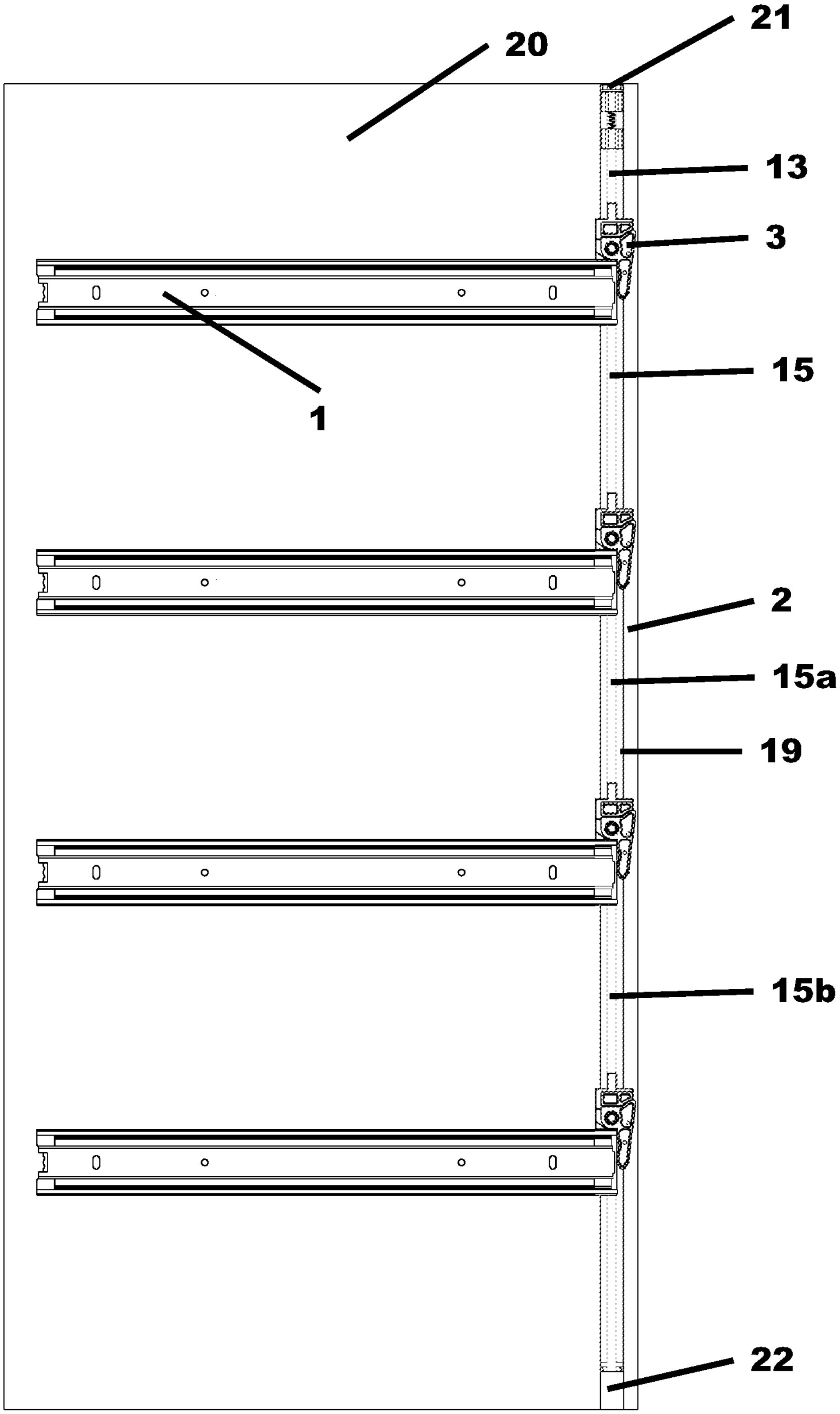

FIG. 9 shows another variant of the invention in which a kit is provided for installing a single piece assembly 2 in a multi drawer storage structure.

Figure 10A:
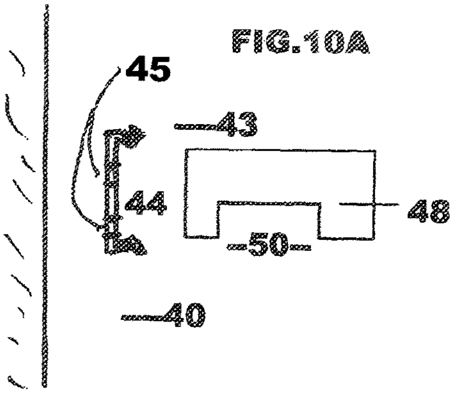
Figure 10B:
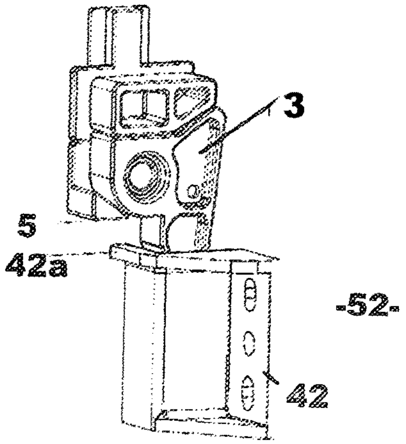
Figure 10B:
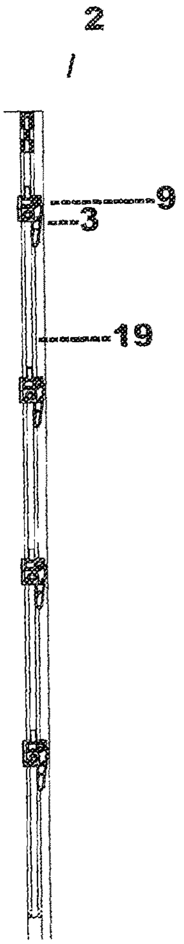
Figure 10C:
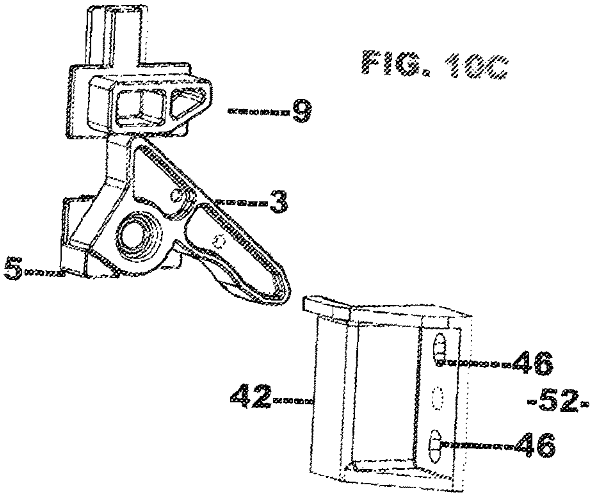

FIGS. 10A, 10B and 10C show a variant of the invention in which a single piece assembly is adapted to be secured within a mounting recess configured in one or more brackets to be secured on a rear inner side wall of a multi drawer storage structure.

While these drawings only provide representations of certain features in preferred embodiments of the invention, other aspects of the invention including modifications, substitutions and variations will become apparent to persons skilled in the art upon reading this specification and the drawings.

DESCRIPTION OF PREFERRED EMBODIMENTS

With reference to FIGS. 1 and 2*a*-2*c*, a single piece system assembly 2 is installed in a cabinet having a vertical array of two drawers, each drawer being associated with corresponding drawer slides 1. Each drawer slide 1 includes an inner drawer slide 1*a* configured to slide within outer drawer slide 1*b* when the supported drawer is moved between a closed position and an open position. The assembly 2 comprises a closed track 19 held within a mounting recess 22 (see FIG. 6) and housing for slidable movement a number of cammed levers 3 (and associated slide bars 13 and 15), each cammed lever 3 (and its associated slide bars 13 and 15) being grouped with their respective associated drawer and drawer slide 1. The mounting recess 22 may be configured in the inside side wall 20 of a movable storage structure such as a furniture or a movable storage unit such as a filing cabinet.

Each cammed lever 3 swivels on a cam axle, for example, a fastener 27 which is secured to back rest 5. The back rest 5 abuts against cam follower 9, the tip of cammed lever 3 being engaged with the leading edge of corresponding drawer slide 1 when the corresponding drawer slide 1 is closed.

Figure 1:
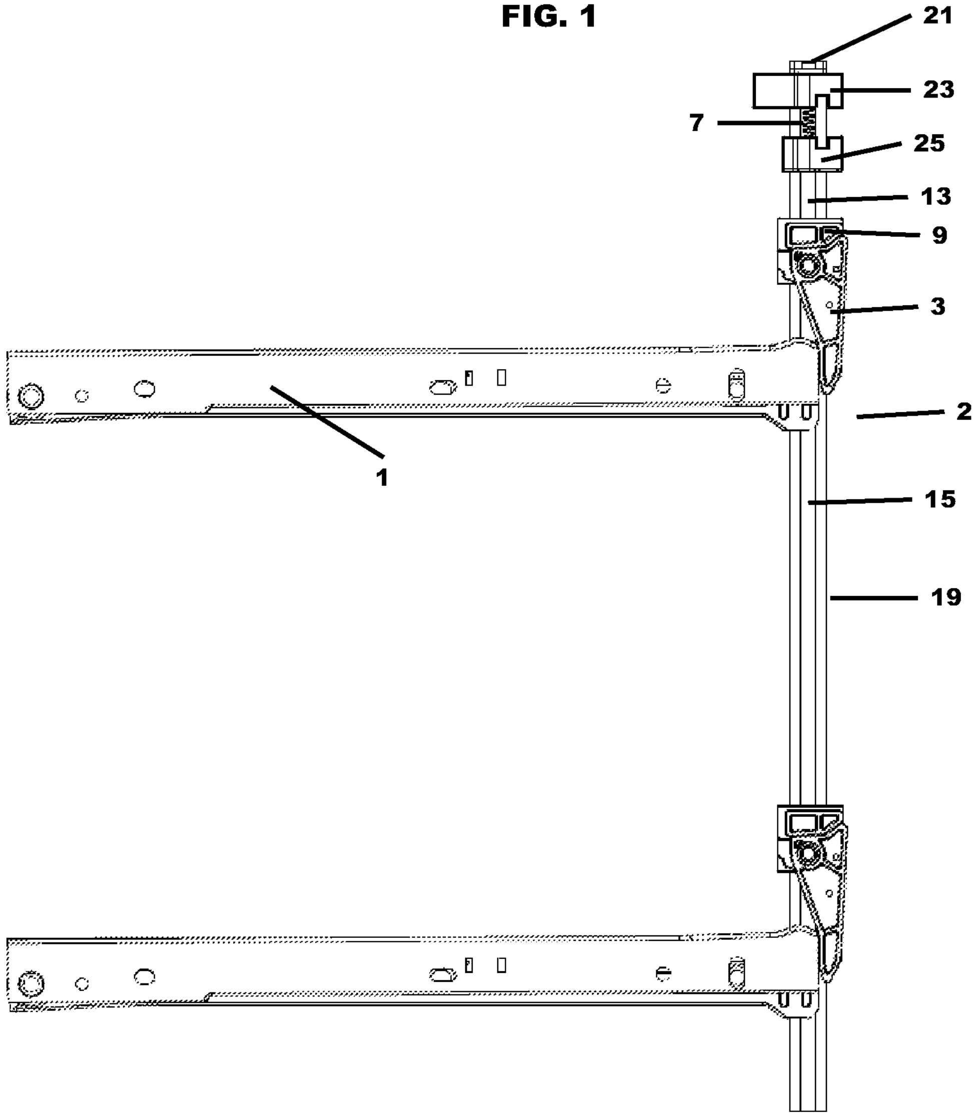

As shown in FIG. 1 and FIG. 4, when all of the drawer slides (and their corresponding drawers) are in the closed position, the top plug 23 is held in place within the track 19 by crimping the ends of the track so that all components are housed, and the desired movement of certain components is permitted, in the channel 21. Arrangements other than crimping could be used to close the end of the track 19 and channel 21. As one alternative example, one or more end plugs (not shown) could be used to seal one or both of the opposed ends of the track to secure the internal components of the single piece assembly within the track. In the closed position, the lower plug 25 is biased by spring 7 to separate from top plug 23 to establish the gap G which represents the total permitted displacement of some of the sliding bars that are activated for sliding movement within the track 19 when the one selected drawer is opened. Lower plug 25 abuts against upper slide bar segment 13. Cam follower 9 is secured to the lower end of upper slide bar segment 13, the cam follower 9 abutting against cammed lever 3 swivel mounted at the upper end of lower bar segment 15 when the associated drawer is closed.

Figure 2A:
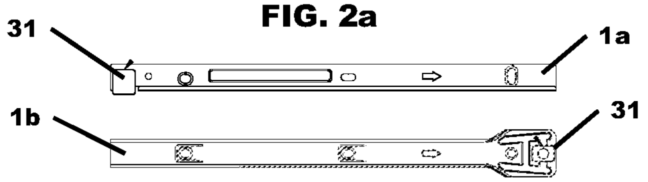
Figure 2B:
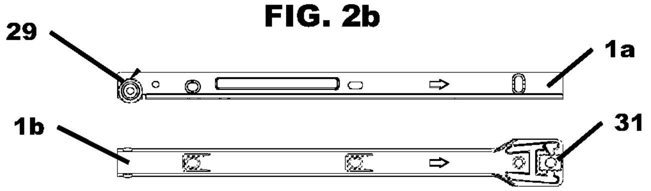
Figure 2C:
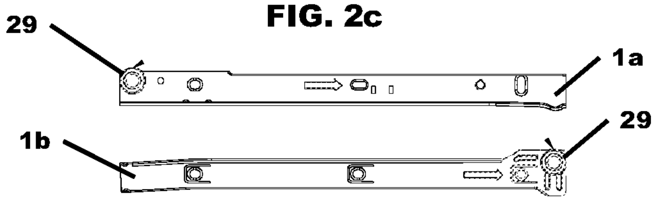

FIGS. 2*a*-2*c* show three different variations of Euro slide configurations incorporating friction reducing paired glides, paired rollers, and rollers with glides. In the top configuration, the drawer member 1*a* and the cabinet member 1*b* are provided with friction reducing glides on both members. In the second (or the middle) illustrated configuration, a roller is provided on the drawer member 1*a* and a glide is provided on the cabinet member 1*b*. In the bottom (or third) configuration, rollers are provided on both of the drawer member 1*a* and the cabinet member 1*b*.

Figure 3A:
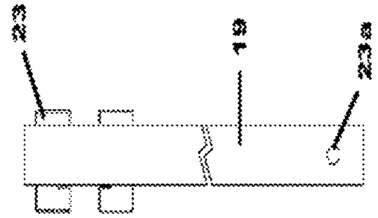
Figure 3B:
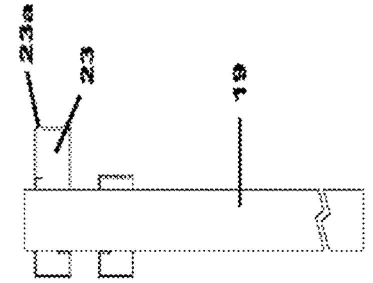
Figure 3C:
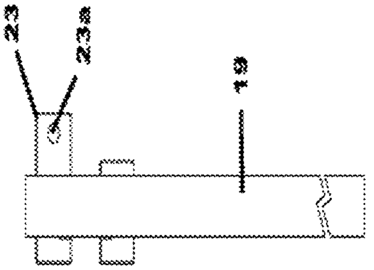
Figure 3D:
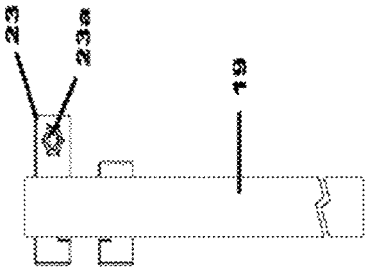
Figure 3E:
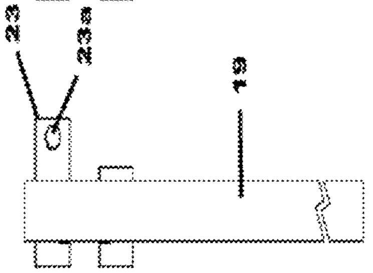
Figure 3F:
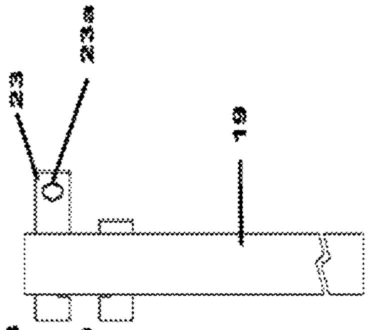

FIGS. 3*a*-3*f* illustrate six examples of different variants of the track 19 shown from the back walls of those variants (discussed below, from left to right):

- In the first variant shown in FIG. 3*a*, a hole is provided at the bottom end of the track 19 for securing the track 19 within the mounting recess 22 of the furniture unit;
- In the second variant shown in FIG. 3*b*, an overhang for locating attachment is provided on the back of the top plug 23, for engagement with a corresponding recess provided at a predetermined location on the interior wall of the furniture unit;
- In the third variant shown in FIG. 3*c*, a mounting feature configured as a hole 23*a* is provided on the top of plug 23 for attachment of the system assembly at a predetermined location along the mounting recess 22;
- In the fourth variant shown in FIG. 3*d*, a press fit plastic dowel 23*a* extends away from the back of the top plug 23 for attachment of the single piece assembly within the mounting recess 22 of the furniture unit;
- In the fifth variant shown in FIG. 3*e*, a round pin 23*a* extends from the back of the top plug 23 for attachment of the single piece assembly within the mounting recess 22 of the furniture unit and
- In the sixth variant shown in FIG. 3*f*, an irregularly shaped pin 23*a* extends from the back of the top plug 23 for attachment of the system assembly of the single piece assembly within the mounting recess 22 of the furniture unit.

In FIGS. 5A to 5E, reference point A represents the point of contact between the cammed lever peak 4 and the adjacent edge of the cam follower 9. The adjacent edge of the cam follower 9 is preferentially sloped (marked "S" on FIG. 5E) to permit smooth operation of the cammed lever 3 when the opened drawer slide 1*a* is moved toward its closed position.

Reference point B represents the position of the bottom edge of bottom plug 25 when the top plug 23 and bottom plug 25 are brought together so that the gap G is closed. Point C represents the location of the center of the fastener 27 when all of the drawer slides (and their respective drawers) are in the closed position.

In FIG. 5D, the reference points Y and Y1 represent the displacement distance of the cammed lever 3 measured with reference to the displacement distance of the contact edge of the tip of the cammed lever 3 as it contacts the lowermost top edge of the inner drawer slide 1*a* (represented by Y) when the drawer slide is extracted and when the tip of the cammed lever tip contacts the topmost surface of the drawer slide 1*a* when the corresponding drawer is fully opened.

In FIG. 5A, the inner drawer slide member 1*a* is shown partially withdrawn from the cabinet as the associated drawer is beginning to move outwardly from the cabinet. The cammed lever 3 has a length L defined as the distance from the center of its cam axle, for example the illustrated fastener 27, to the tip of the cammed lever 3. The cammed lever 3 is shown in a preferred detent position corresponding to the drawer beginning to open, with the tip of the lever 3 having been displaced upwardly by passing over the maximum height of the leading edge profile presented by the leading edge of the inner slide member 1*a*.

In FIG. 5B, the gap G is compressed and the cammed lever 3 is illustrated in the detent position established as the drawer was partially withdrawn in FIG. 5A. In FIG. 5B, the inner drawer slide 1*a* is shown fully extended when the drawer is fully open.

In FIG. 5C, the positions of the inner drawer slide 1*a* and the cammed lever 3 are shown as the associated open drawer is moved to a partially removed position by upwardly displacing the drawer and the inner drawer slide 1*a* so that its roller 29 passes over the top of the roller mounted on the outer cabinet drawer slide member 1*b*. The cammed lever 3 is moved to the second detent position so that the lever 3 remains fully opened in the second detent position as further illustrated in FIG. 5D. When the cammed lever 3 is in this second detent position, the bottom edge of the cammed lever 3 has moved a displacement distance Y1, parallel to the top surface of the inner drawer slide member 1*a*, the bottom edge of the lever 3 being at a position where the clearance is sufficient to permit reentry into the cabinet, the displacement distance Y1 being greater than the distance Y measured as the height of the inner drawer slide member 1*a*. The displacement distance Y1 corresponds to the height of the leading edge profile presented by the Euro slide 1 when the drawer is fully closed, in the cabinet.

FIG. 6 shows the single piece assembly 2, comprising two drawers and their corresponding drawers slides when they are in the fully closed position.

FIG. 7 illustrates another embodiment of the invention in which a lead screw plug 33 houses a lead screw 35 provided as a fixed component of the single piece assembly 2, In the configuration shown in FIG. 7, the lead screw 35 acts on an adjustable top plug locating feature 23*a* to move the adjustable top plug 23*b* to modify the gap G, and thereby adjust the separation distance between opposing surfaces of the adjustable top plug 23*b* and the bottom plug 25 if needed. In an alternative configuration (not shown), the lead screw 35 may be housed in a lead screw plug 33 which is separate from, but placed in abutting position to, the single piece assembly 2, so that, when the single piece assembly 2 is assembled and placed within the mounting recess 22, the lead screw 33 may be used to adjust the vertical placement of the single piece assembly 2 within a range of permitted locations along a suitably configured mounting recess 22. This variant, although not preferred, may be utilized so that the combined sliding bar and cammed lever assembly within the track 19 may be located within a defined range of positions along the axis of the mounting recess 22, for optimal positioning and alignment of the cammed levers with their associated drawer slides within the multi drawer furniture unit.

FIGS. 8A, 8B, and 8C, are examples of other variants of the invention which are not preferred, but are mentioned to illustrate other aspects of the invention. In these single piece assemblies, the slide bars operate and interact differently from the embodiment shown in FIGS. 1-7 and 9.

In FIG. 8B, an opening drawer is not blocked in the same manner by its corresponding cammed lever 3. The slide bars 13 and 15 interact differently, so that when cammed lever 3 is moved toward its open position. Downward displacement is blocked, so that an upward force is generated to move the sliding bar or sliding bars located above the affected cammed lever 3 to move those sliding bars upwardly, to act on the lower plug 25 and thereby close the gap G.

In FIG. 8A, the spring tension must be sufficient to support the weight of the combination of the plug 23, cammed levers and sliding bars provided within the track 19 of this variant of the single piece assembly 2. For example, when a cammed lever 3 is moved toward its open position by an opening drawer slide 1, all sliding bars located below the affected cammed lever will be displaced downwardly, to act upon the plug 23, to close the gap G between plug 23 and stationary plug 25 shown in this figure.

In FIG. 8C, a single piece assembly 2 is similar to the single piece assembly illustrated in FIG. 8A except that the orientation of the cammed levers is directed upwardly. In this aspect, when a cammed lever 3 is moved toward its open position by an opening drawer slide 1, all sliding bars located below the affected cammed lever will be displaced downwardly, to act upon the plug 23, to close the gap G between plug 23 and stationary plug 25 shown in this figure. If the lower most cammed lever 3 is affected by opening of the lowermost drawer slide 1 will act upon the affected cam follower 9 shown in this figure, to act upon the plug 23, to thereby close the gap G, In other aspects of the invention, mirrored configurations of the single piece assemblies may be provided for installation on a left side, inner wall of a furniture unit. Persons skilled in the art will understand that the mirrored configurations will operate in a similar manner to their respective configurations illustrated in the embodiments described in FIGS. 1-9 and shown for mounting on the right side of an inner wall of the furniture units illustrated therein.

In another aspect of the invention, as illustrated in FIGS. 10A, 10B and 10C, the single piece assembly 2 may be mounted on a rear inner side wall 40 of the storage structure.

A wood strip 48 is shown as a mounting support for the single piece assembly 2, to be mounted in mounting recess 50, perpendicular to the rear inner side wall 40 of the storage structure. (Wood strip 48 and single piece assembly 2 are not shown to scale in FIG. 10A.) At least one mounting bracket 43 is used to secure the wood strip 48 to the rear inner side wall 40. For example, fasteners (not shown) may be used to secure the mounting bracket 43 through mounting apertures 45 and into the rear inner side wall 40. In those aspects where two or more brackets 43 are used, mounting recess 50 comprises a corresponding number of two or more mounting recess portions to form the mounting recess 50.

The rear outer side wall 52 of the storage compartment is shown having a latch 42 which may be secured to side wall 52 with fasteners engaged with fastening apertures 46 by, for example, a furniture manufacturer. When the single piece assembly 2 is installed in this example, levered cam 3 is engaged with abutment 42*a* of cam latch 42, when the corresponding storage compartment is in the closed position. When the associated storage compartment is moved to the open position, the cammed lever 3 is activated and the cam follower 9 is displaced to close the gap G to prevent the other cammed levers and their associated storage compartments from opening.

In another embodiment of the invention described with reference to FIG. 1 and FIG. 9, a manufacturing kit is provided to meet customer specifications for a variety of furniture heights, number of drawers, drawer heights, slide locations, and to satisfy other requirements. Customers may provide furniture specifications so that a manufacturer may provide component parts which are made to size and to be assembled into a single piece assembly 2 for each specific item or model of furniture or other storage units. Each kit for a single piece assembly 2 may be designed to provide specifically made parts including track 19, and the internal bars (for example, upper bar 13, lower bars 15, 15*a*, 15*b*, the bar supporting the cam follower, the bar supporting the cam lever, additional sliding bars if needed, and the like). Also, the kit may include sliding bars of different lengths and configurations. In some instances, the kit may include a variety of sliding bars of different lengths so that two or more sliding bars may be selected, each of defined lengths P and Q, so that the bars may be installed into a track in abutting arrangement, to function in a manner similar to a single sliding bar of a length P+Q. In addition, the kit may include cam levers, cam followers and their supporting bar segments (made in optional plastic, zinc, or other suitable material), and including other component configurations and sizes. The kits may also include dummy drawer slides for use in those furniture units having retractable storage compartments which are not mounted on drawer slides or are mounted on undermounted slides.

Given all possible furniture heights, number of drawers and drawer heights, a substantial number of anti-tip SKU's may be required to serve the marketplace with suitable kits compatible with customer furniture and storage unit configurations.

Such anti-tip systems may be sold to furniture manufacturers through hardware distributors.

The substantial number of SKU's which may be necessary for a wide range of different components are difficult or in some cases, impossible, to stock for sale through all distributors. In those instances where such systems are not readily available, those systems, including kits for those systems. may be made to order for customers such as furniture manufacturers.

The anti-tip system can be made available in kit format to be assembled by the furniture manufacturers. Preferably, the kit will provide components of standard sizes.

Mounting recess 22, configured as a groove 22 needs to be at least as long as track 19. Sufficient space at the bottom of groove 22 may allow for different lengths of track 19 without affecting the function of the single piece assembly 2. Preferably, track 19 is slightly longer than the distance from the top of the single piece assembly 2 to the bottom edge of the assembly 2 when it is assembled for installation in the furniture unit. For certain furniture products, for example, the mounting recess 22 and the single piece assembly 2 may be configured to abut against the inside upper wall of the storage unit, to simplify the installation of the single piece assembly 2 in those applications.

By way of further example, slide bars (13, 15) may be available in specific bundles of sizes (for example, 6", 3", 2", 1" in length). Of course, other sizes may be provided to meet customer needs.

Customers may acquire track 19 in a standard size that fits within the length of the groove in the multi drawer furniture unit and provides sufficient track space to accommodate the required components with a suitable slide fit to limit undesirable play within the single piece assembly once assembled for installation. The internal space of the selected track 19 housing the assembled components of the single piece assembly will be sufficient for the desired slide fit arrangement of the assembled components starting at the top edge of the top block and terminating below the bottom edge of the last slide.

Manufacturers may assemble slide bar components within a suitably configured track 19 to accommodate the number and sizes of the drawers, to service the specific drawer heights. For example, a slide bar assembly for a 7" drawer may use 1" and 6" bars. By way of further example, a 5" drawer may use 2"+3" bars. Of course, other configurations are possible for specific drawer heights as required by the customers.

Customers may select the cam lever assemblies (for example, cammed levers 3, lever bases 5, cam followers 9, and cam axles 27) for their storage unit applications. These components would be installed in the appropriate locations.

Once the components have been assembled by the manufacturer, the top end of track 19 may be closed by, for example, crimping or folding using a suitable tool or machine or optionally a top plug 23 with a fastening screw or other closure arrangement to hold all of the components together in the desired spatial array desired for the customer specified single piece assembly 2.

In kits for mounting the single piece assembly 2 on the rear inner side wall of a storage compartment, additional brackets 43, latches 42 and a suitable number of fasteners (not shown) may be provided to facilitate convenience of manufacture for those storage structures.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "mounted", "connected", "attached" or "coupled" to another feature or element, it can be directly mounted, connected, attached or coupled to the other feature or element or intervening features or elements may be present. In contrast, when a feature or element is referred to as being "directly mounted", "directly connected", "directly attached" or "directly coupled" to another feature or element, there are no intervening features or elements present. Although described or shown with respect to one embodiment, the features and elements so described or shown can apply to other embodiments. It will also be appreciated by those skilled in the art that references to a structure or feature that is disposed "adjacent" another feature may have portions that overlap or underlie the adjacent feature.

Terminology used herein is for the purpose of describing particular embodiments only and is not intended to be limiting. For example, as used herein, the singular forms "a", "an" and "the" are intended to include the plural forms as well, unless the context clearly indicates otherwise. As used herein, the term "and/or" includes any and all combinations of one or more of the associated listed items.

Spatially relative terms, such as "interior", "inner", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present systems.

The terms "comprises", "comprise", and/or "comprising," when used in this specification (including the claims), specify the presence of stated features, steps, operations, elements, and/or components, but do not preclude the presence or addition of one or more other features, steps, operations, elements, components, and/or groups thereof. Unless the context requires otherwise, "comprise", and variations such as "comprises" and "comprising," means various components can be co-jointly employed in the articles (e.g., compositions and systems). For example, the term "comprising" will be understood to imply the inclusion of any stated elements or steps but not the exclusion of any other elements or steps.

Any of the systems described herein may include all or a sub-set of the components, and these components may be either non-exclusive (e.g., may include additional components) or in some variations may be exclusive, and therefore may be expressed as "consisting of" or alternatively "consisting essentially of" the various components, or sub-components.

Although various illustrative embodiments are described above, any of a number of changes may be made to various embodiments without departing from the scope of the disclosure as described. Optional features of various device and system embodiments may be included in some embodiments and not in others. Therefore, the foregoing description is provided primarily for exemplary purposes and should not be interpreted to limit the scope of the system as it is described or set forth in the specification and drawings.

Various embodiments may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those skilled in the art upon reviewing the specification and drawings.

PARTS LIST FOR ILLUSTRATED EMBODIMENTS

1=drawer slide
1*a*=inner drawer slide member 1*b*=outer cabinet slide member
2=single piece system assembly
3=cammed lever
4=cammed lever peak
5=lever base
7=spring
9=cam follower
13=upper slide bar
15, 15*a*, 15*b*=lower slide bars
19=track
20=inner side wall (or inner sidewall)
21=channel
22=mounting recess
23=top plug
23*a*=top plug locating feature
25=bottom plug
27=cam axle
29=roller
31=glide
33=lead screw plug
35=lead screw
40=rear inner side wall
42=latch
42*a*=abutment
43=mounting bracket
44=mounting recess
45=bracket mounting apertures
46=latch fastening apertures
48=wood strip
50=mounting recess
52=outer rear side wall of the storage compartment
G=gap
A=alignment point A
B=alignment point B
C=alignment point C
L=length between the cam lever peak and the center of the fastener
S=slope
Y=height of the inner drawer slide member
Y1=displacement distance, greater than Y

We claim:

1. A tamper resistant anti-tip system configured for installation and use in a storage structure and configured for secure attachment: (a) within a mounting recess in an interior side wall of the storage structure or (b) on a surface portion of the interior side wall of the storage structure, the storage structure having two or more retractable compartments comprising a first retractable compartment and a second retractable compartment, the system comprising:

a track configured for secure attachment to the interior side wall of the storage structure, a stack of aligned sliding bars configured to slide along the track when installed in the storage structure, the sliding bars comprising a first sliding bar interacting with a first cammed lever associated for selective opening and closing operation with the first retractable compartment and a second sliding bar interacting with a second cammed lever associated for selective opening and closing operation with the second retractable compartment, and a sliding bar segment acting against the first sliding bar when the two or more retractable compartments are closed, the sliding bar segment configured to slide along the track to close a gap defined between a first plug and a second plug when the first cammed lever is activated by an outwardly projecting activation contact comprising a leading edge slide profile moving along with the first retractable compartment toward an open position, the first plug being secured at a first closed end of the track and the second plug being biased to separate the second plug and the stack of aligned sliding bars from the first plug to form the gap between the first plug and the second plug when the two or more retractable compartments are closed, wherein the system is configured to allow displacement of one or more of the aligned sliding bars along the track limited to a displacement distance defined by the gap between the first plug and the second plug when all of the retractable compartments are closed, wherein the gap is closed when one of the retractable compartments is opened, the leading edge slide profile defining a height equal to the displacement distance, wherein a corresponding sliding bar acted upon by an activated cammed lever is configured to be associated with the retractable compartment associated with the cammed lever wherein each cammed lever is configured to move to an open position when the associated retractable compartment is opened, wherein the associated retractable compartment may be removed from the storage structure and the associated cammed lever remains in the open position when the retractable compartment is removed, wherein the gap is compressed when the associated retractable compartment is removed or open, and wherein sliding bars other than the corresponding sliding bar are inhibited against moving within the track to prevent opening of the closed retractable compartments.

2. A storage structure comprising the anti-tip system of claim 1, wherein the system is secured within the mounting recess with a fastener when the fastener is located at a selected engagement position along a range of selectable engagement positions defined at the mounting recess.

3. A storage structure comprising the anti-tip system of claim 1, the stack of aligned sliding bars being configured for selective sliding movement along a linear path within the track between an adjustable installation position of the first plug and a closed opposite end of the track, wherein the anti-tip system further includes an adjustable feature for moving the position of the system to a selected position within a range of selectable positions defined along the mounting recess.

4. A storage structure comprising the anti-tip system of claim 1, the stack of aligned sliding bars being configured for selective sliding movement along a linear path within the track between an installation position of the first plug and a fixed position opposite the first plug, the gap being adjustable by operating a top plug locating feature acting on the position of the first plug.

5. The anti-tip system as claimed in claim 1, wherein the outwardly projecting activation contact is selected from a group consisting of a pin, flange, bracket, and an add-on abutment structure, provided to create the leading edge slide profile.

6. An anti-tip system configured for installation and use in a storage structure having two or more retractable compartments, wherein each retractable compartment is movable between a retracted closed position and an extended open position on a compartment slide comprising a first compartment slide that is fixed with respect to an inside wall of the storage structure and a second compartment slide that is fixed with respect to and moveable with the associated retractable compartment, wherein the anti-tip system comprises:

a cam lever associated with each retractable compartment, wherein the cam lever is configured to be contacted by a leading edge profile of the second compartment slide of the associated retractable compartment when the associated retractable compartment is moved from its retracted closed position to its extended open position to move the cam lever from a locked position to a first open position; and a cam follower associated with each retractable compartment and positioned to be engaged by the cam lever of the associated retractable compartment so that movement of the cam lever from the locked position to the first open position moves the associated cam follower from a locked position to an open position;

wherein each cam lever is configured to be moved to a second open position when the cam lever is engaged by the second compartment slide of the associated retractable compartment as the second compartment slide is disengage from the first compartment slide when the associated retractable compartment is removed from the storage structure, and wherein the cam lever is configured to remain in the second open position to permit the second compartment slide of the associated retractable compartment to be re-engaged with the first compartment slide to reinstall the associated retractable compartment into the storage structure.

7. The anti-tip system of claim 6, further comprising:

a track configured for secure attachment to the inside wall of the storage structure, a stack of aligned bar segments configured to slide along the track, wherein each cam lever and each cam follower is coupled to the stack of aligned bar segments so that movement of each of the cam followers slides one or more of the bar segments along the track;

a first plug; and a second plug positioned in facing opposition to the first plug, wherein the second plug is coupled to the aligned bar segments to move with respect to the first plug when one or more of the bar segments slide along the track;

wherein, with all the retractable compartments in the retracted closed positions and the associated cam levers initially in the locked positions, the first plug is spaced apart from the second plug to form a gap between the first plug and the second plug, wherein movement of a first one of the retractable compartments to the extended open position moves the associated cam lever to the first open position, the associated cam lever engages the associated cam follower to move the associated cam follower to the open position, the associated cam follower actuates one or more of the aligned bar segments to move the second plug with respect to the first plug to close the gap, thereby preventing further sliding of any bar segments to prevent movement of the cam lever and the cam follower associated with each other retractable compartment other than the first retractable to block movement of each other retractable compartment from its retracted closed position to its extended open position.

8. The anti-tip system of claim 6, each cam lever having an extended tip of sufficient length to abut against the leading edge of the second compartment slide when the associated retractable compartment is in the closed position, when the first retractable compartment is moved to the open position and the cam lever is in its locked position, the second compartment slide contacts the cam lever at the extended tip to move the cam lever from the locked position to the first open position.

9. The anti-tip system of claim 7, wherein the first plug is configured to be in an adjustable fixed position to vary a displacement distance of the gap to accommodate adjustments or manufacturing tolerances associated with the anti-tip system.

10. The anti-tip system of claim 6, wherein, when installed, the system is secured to a mounting recess defined on the inside wall of the storage structure without attachment to the retractable compartments or the corresponding first and second slides.

11. The anti-tip system of claim 6, wherein, when one of the retractable storage compartments is removed, the associated cam lever is in the second open position, and when the removed retractable compartment is moved toward the storage structure for sliding reengagement of the second compartment slide with the first compartment slide, upon reengagement of the second compartment slide with the first compartment slide, the cam lever associated with the removed storage compartment is configured for manual reset movement from the second open position to the first open position.

12. The anti-tip system of claim 7, the track limiting movement of the stack of aligned sliding bars for sliding movement along a partially enclosed linear path between an installation position of the first plug at a first end of the track and a track stop at a second opposite end.

13. The anti-tip system of claim 7, wherein the system is configured for use of a single fastener to securely attach the track within a mounting recess in the inside wall of the storage structure, the stack of sliding bars being configured for selective traveling along a linear path within the track between the first plug and a terminal sliding bar at a fixed position opposite an installation position of the first plug.

14. The anti-tip system of claim 7, wherein the second plug is biased to move away from the first plug to establish the gap when retractable compartments are in the closed position.

* * * * *